(12) United States Patent
Wang et al.

(10) Patent No.: US 12,506,666 B2
(45) Date of Patent: Dec. 23, 2025

(54) METHOD AND SYSTEM FOR CREATING DATA FLOW ARCHITECTURE OF ACCESS NETWORKS

(71) Applicant: Lockheed Martin Corporation, Bethesda, MD (US)

(72) Inventors: Angela Kuo Wang, Cupertino, CA (US); Michael John D'Ortenzio, Mountain View, CA (US); David John Rowe, San Jose, CA (US); Gustave Anderson, Roanoke, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 116 days.

(21) Appl. No.: 18/621,587

(22) Filed: Mar. 29, 2024

(65) Prior Publication Data
US 2024/0333610 A1    Oct. 3, 2024

Related U.S. Application Data (60) Provisional application No. 63/493,478, filed on Mar. 31, 2023.

(51) Int. Cl.
*H04L 41/5041* (2022.01)
*H04L 41/5003* (2022.01)
*H04W 76/16* (2018.01)

(52) U.S. Cl.
CPC ...... *H04L 41/5041* (2013.01); *H04L 41/5003* (2013.01); *H04W 76/16* (2018.02)

(58) Field of Classification Search
CPC . H04L 41/5003; H04L 41/5041; H04W 76/16
See application file for complete search history.

(56) References Cited

U.S. PATENT DOCUMENTS

| 10,178,587 B2 * | 1/2019 | Chaudhuri ........ H04W 36/0058 |
| 10,405,263 B2 | 9/2019 | Mukherjee |

(Continued)

FOREIGN PATENT DOCUMENTS

| CN | 105610829 A | 5/2016 |
| CN | 113133030 A | 7/2021 |

(Continued)

*Primary Examiner* — Kostas J Katsikis
(74) *Attorney, Agent, or Firm* — Baker Botts L.L.P.

(57) ABSTRACT

Embodiments disclose a network system that includes a memory that may be configured to store registration information of a computing device and a hardware processor communicatively coupled to the memory. The processor may be configured to detect application data specifying a network connection request from stream of data packets of the client computing device. From registration information, a type of computing device may be detected and a type of wireless service from the application data and network connection request of computing device may be determined. The processor may determine different access networks available for type of wireless service of client computing device. A data flow architecture and service interface may be created to establish network connection with core networks by integrating different access networks and translation of data flow may be performed according to the data flow architecture and service interface for wireless communication with the core networks.

20 Claims, 5 Drawing Sheets

(56) References Cited

U.S. PATENT DOCUMENTS

| | | | |
|---|---|---|---|
| 10,462,723 B2 | 10/2019 | Zhang et al. | |
| 2009/0052460 A1* | 2/2009 | Coulas | H04W 48/12 370/401 |
| 2014/0086177 A1* | 3/2014 | Adjakple | H04W 74/04 370/329 |
| 2016/0127988 A1* | 5/2016 | Yao | H04W 48/20 370/338 |
| 2017/0093722 A1* | 3/2017 | González Castaño | H04L 47/22 |
| 2020/0178121 A1 | 6/2020 | Simon et al. | |
| 2021/0064410 A1 | 3/2021 | Yun et al. | |
| 2023/0336440 A1* | 10/2023 | Trujillo | H04L 41/40 |

FOREIGN PATENT DOCUMENTS

| | | | |
|---|---|---|---|
| EP | 3945709 A1 | 2/2022 |
| WO | 2020198571 A2 | 10/2020 |
| WO | 2021226934 A1 | 11/2021 |
| WO | 2021242247 A1 | 12/2021 |

\* cited by examiner

METHOD AND SYSTEM FOR CREATING DATA FLOW ARCHITECTURE OF ACCESS NETWORKS

BENEFIT CLAIM

This application claims the benefit under 35 U.S.C. § 119 (e) of provisional patent application 63/493,478, filed Mar. 31, 2023, the entire contents of which are hereby incorporated by reference as if fully set forth herein.

TECHNICAL FIELD

This disclosure generally relates to a Service-Interface-As-Type and, more particularly, to a network communication architecture to manage workflow, tasking, and messaging via alternate network communication layers for wireless communication with core network stations.

BACKGROUND

Conventional approaches involving standard d and non-standard network communications may be vulnerable to threats. For example, a third-generation partnership project (3GPP) in the 5G physical layer (Layer 1) may be vulnerable to threats in the network operating environments and may be unsuitable for certain uses in contested domains. Radio frequency (RF) environments do not provide security or protection for a user computing device in RF environments, and the conventional approaches do not conceal or protect the network computing devices, and those devices become vulnerable where an attacker may easily detect and control the devices.

DETAILED DESCRIPTION

Overview

Embodiments of the present disclosure relate to a network system. The system includes a memory that may be configured to store registration information of a client computing device and a hardware processor communicatively coupled to the memory. The hardware processor may be configured to detect application data specifying a network connection request from a stream of data packets of the client computing device. From the registration information, a type of the client computing device may be detected and a type of wireless service from the application data and the network connection request of the client computing device may be determined. The hardware processor may be configured to determine a plurality of different access networks available for the type of wireless service of the client computing device. A data flow architecture and service interface may be created to establish a network connection with a plurality of core networks by integrating the plurality of different access networks and translation of data flow may be performed according to the data flow architecture and service interface for wireless communication with the plurality of core networks using the plurality of different access networks.

Embodiments of the present disclosure relate to a computer-implemented method. The method may be performed by a system including a network controller and/or a router and a computing device. The system includes a memory configured to store registration information of the client computing device and a hardware processor communicatively coupled to the memory. The method includes detecting application data specifying a network connection request from a stream of data packets of the client computing device. The method includes detecting a type of client computing device from the registration information and determining a type of wireless service from the application data and the network connection request of the client computing device. The method includes determining a plurality of different access networks available for the type of wireless service of the client computing device. The method includes creating a data flow architecture and service interface to establish a network connection with a plurality of core networks by integrating the plurality of different access networks. The method includes performing a translation of data flow according to the data flow architecture and service interface for wireless communication with the plurality of core networks using the plurality of different access networks.

Embodiments of the present disclosure relate to a non-transitory computer-readable medium storing instructions that, when executed by a processor, cause the processor to perform one or more steps. The processor may be configured to detect application data specifying a network connection request from a stream of data packets of the client computing device. The processor may be configured to detect a type of the client computing device from the registration information and determine a type of wireless service from the application data and the network connection request of the client computing device. The processor may be configured to determine a plurality of different access networks available for the type of wireless service of the client computing device. The processor may be configured to create a data flow architecture and service interface to establish a network connection with a plurality of core networks by integrating the plurality of different access networks and perform a translation of data flow according to the data flow architecture and service interface for wireless communication with the plurality of core networks using the plurality of different access networks.

In an embodiment, this disclosure provides a solution to the existing systems and provides various benefits. For example, the embodiments provide software architecture to ensure ALT PHY interoperation with 5G or non-5G upper layers in the network (and 5G or non-5G UE chipsets). In an embodiment, the utilization of the Service-Interface-As-Type for network communication may be programming language independent. The embodiments further provide advantages in modularization, reusability, maintainability and testing, scalability, and extensibility. Also, the utilization of the Service-Interface-As-Type for network connectivity may reduce physical interface integration risks of alternate physical layers (ALT PHY) in the client computing device. Embodiments may utilize ad-hoc software architecture using non-object-oriented data structures and context-specific interface, multiple interfaces at vendor/client programmer system level and separate (repeated) software threads for each ALT PHY access to the core network. Further, the disclosure may be used in any market requiring secure resilience, for example, LPX communication in stressed or contested environments, military and specialized environments. For example, the disclosure may be used in tactical environments that may be related to military, specialized or contested and denied environments, blue force tracking of personnel and equipment using NB-IOT, mMTC used for industrial, power/nuclear plant sensors, industrial/battlefield IOTs and eMBB, and securing connection to edge computing and real-time sensing nodes.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Embodiments of the present disclosure provide a system, a method, and a non-transitory storage medium for utilizing access networks and creating data flow architecture(s) and service interface(s) for the translation of data flow in network communication environments. Embodiments detect application data of a client computing device, for example, an application, for example, chat application, video stream, or audio stream running in a smartphone. The application may need a particular kind of service and connection with a core network/base station/network station that provides a wireless or wired connection. In a network environment, the system of the present disclosure may be a medium or interface that may be installed in the computing device, that is, a smartphone, or maybe a router that enables communication of the device with the core network(s). The system may be a network control system or a controller to detect the application of the client computing device, and that application may specify a network connection request that may be detected from the stream of data packets the computing device may be requested to access. For example, from the stream of data packets of the application data and registration information of the client computing device, it may be detected that the application data and the computing device may need a certain quality of service, bandwidth, and network speed. Based on the application data and the registration information of the client computing device, the system determines which are the access networks, for example, 3GPP Standard Access, 3GPP Custom Access, and/or Non-3GPP Access which includes WiFi, available to establish the network connection with core networks. The system then utilizes the available access networks and integrates the available access networks to create a network architecture for the translation of data flow using different and/or the same available access networks that enable wireless communication with the core network(s). For example, the data flow (network) architecture may include a suite of interfaces created by using non-3GPP (generation partnership project) access architecture, non-cellular architecture, alternate physical layer (ALT PHY) architecture in the client computing device, alternate networking and interconnection of communicating nodes, overlay and interconnection of heterogenous 3GPP networking architecture, heterogenous topologies and interconnection of communication layers within 3GPP networking architecture, overlay and interconnection of heterogenous non-3GPP networking architecture, non-5G-Capable over WLAN (N5CW) interconnection architecture, non-3GPP inter-working function (N3IWF) architecture, C3RAT architecture, policy enforcement architecture based on the application data and the registration information, overlay management architecture, command and control broker (C2B) and data link gateway (DLG) architecture and other interfaces. The system may be configured to create the data flow architecture and service interface to result in any of the low-probability of X (LPX) capability, low probability of intercept (LPI) capability, low probability of detection (LPD) capability, anti-jam capability, satellite access capability, and operation through outage capability. In one embodiment, the system may be configured to convert radio frequency (RF) signals into a stream of data packets of one or more of: non-tactical waveforms, tactical waveforms, standard waveforms and custom waveforms via the data flow architecture and service interface for wireless communication with the core network(s). This manner of creating the network architecture and service interface with various layers of network interfaces may secure the computing device from detection, and the computing device may be undetectable by a jammer or malicious device.

As one example, a smartphone belonging to a particular user and requesting a particular type of service may be detected from the registration information. Various tactical network radios, for example, tactical radio TR1 and TR2, that are available for communicating with core networks, may be determined in a network environment. Tactical network radios may be associated with military, specialized or congested or denied environments. The system may then utilize TR1 to carry the connection request with a core network and create a data flow (network) architecture of the smartphone, TR1, and core network to perform data flow translation from the smartphone with the core network using TR1.

In some embodiments, a part or a portion of frequencies and bandwidth of access networks may be utilized for creating the data flow (network) architecture and service interface. In some embodiments, the stream of data packets may be partitioned, and the available access networks in whole or in part with or without the combination of the other access networks in whole or in part may be utilized for the partitioned data packets for creating the data flow architecture and service interface to have wireless connection and communication with the core network.

In some embodiments, the system may detect the type of client computing device and a user of the client computing device from the registration information and type of application data of the client computing device. From the detection, the system may approve establishing the connection request with the core network and the system may hop the data packets from the computing device using the available access networks and establish communication with the core network(s). In some embodiments, the system may deny the connection request and may not approve utilizing the access network. In this instance, the system may discard the data packets and notify the computing device and/or network operator of the network environment that an unregistered or malicious device may be present in the network environment.

Embodiments of the present disclosure relate to a Service-Interface-As-Type and, more particularly, to a software system architecture to manage workflow, tasking, and messaging in alternate physical (ALT PHY) layers in the client computing device for accessing network base station or node base or base station or core network interface to enable network communication resiliency. The network communication may include 5G and any networking ecosystems to access any cellular gNodeB or core networks. Embodiments of the present disclosure provide benefits of using modified network architecture interfaces and layers for various network applications, for example, tactical applications, military applications, and tactical networks.

Embodiments of the present disclosure provide a mobile application for security using various communication networks. The mobile application and the network control system may leverage commercial and non-commercial network technology, products, operations, and standards, for example, 5G, to provide global, secure, and persistent wireless communications and services while keeping the device undetectable. For example, the mobile application and the network control system may be interoperable with any suitable legacy network systems. In an embodiment, network configurations of the network systems may include private stand-alone systems, heterogeneous private and commercial/public 5G systems, heterogeneous networks and legacy tactical and strategic systems, and relocatable and rapidly deployable comms-on-the-move systems. Embodiments of the present disclosure provide development of network communication physical layer resiliency, for example, LPX capability, Anti-Jam (AJ), satellite access, and operation through an outage, to overcome the inherent weaknesses in standard 3GPP 5G and non-standard 3GPP commercial off-the-shelf PHY (COTS PHY). In an embodiment, the reuse of upper layers, for example, Layer 2 (L2) and Layer 3 (L3) may be maximized in either a 3GPP or non-3GPP Radio Access Network (RAN) protocol stack. The disclosure is also related to creating an ALT PHY that provides modification/extension of an existing standard interface between the PHY layer and upper layers to enable multiple PHY vendor offerings. In some embodiments, software systems architecture may be provided to manage the workflow, and services at the heterogeneous interface may be disclosed between the ALT PHY and the L2 and/or L3 protocol. In an embodiment, the software system architecture and service interface may be applied to user equipment (UE) PHY interface to 5G UE chipsets.

The embodiments disclosed herein are only examples, and the scope of this disclosure is not limited to them. Particular embodiments may include all, some, or none of the components, elements, features, functions, operations, or steps of the embodiments disclosed herein. Embodiments according to the present disclosure are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
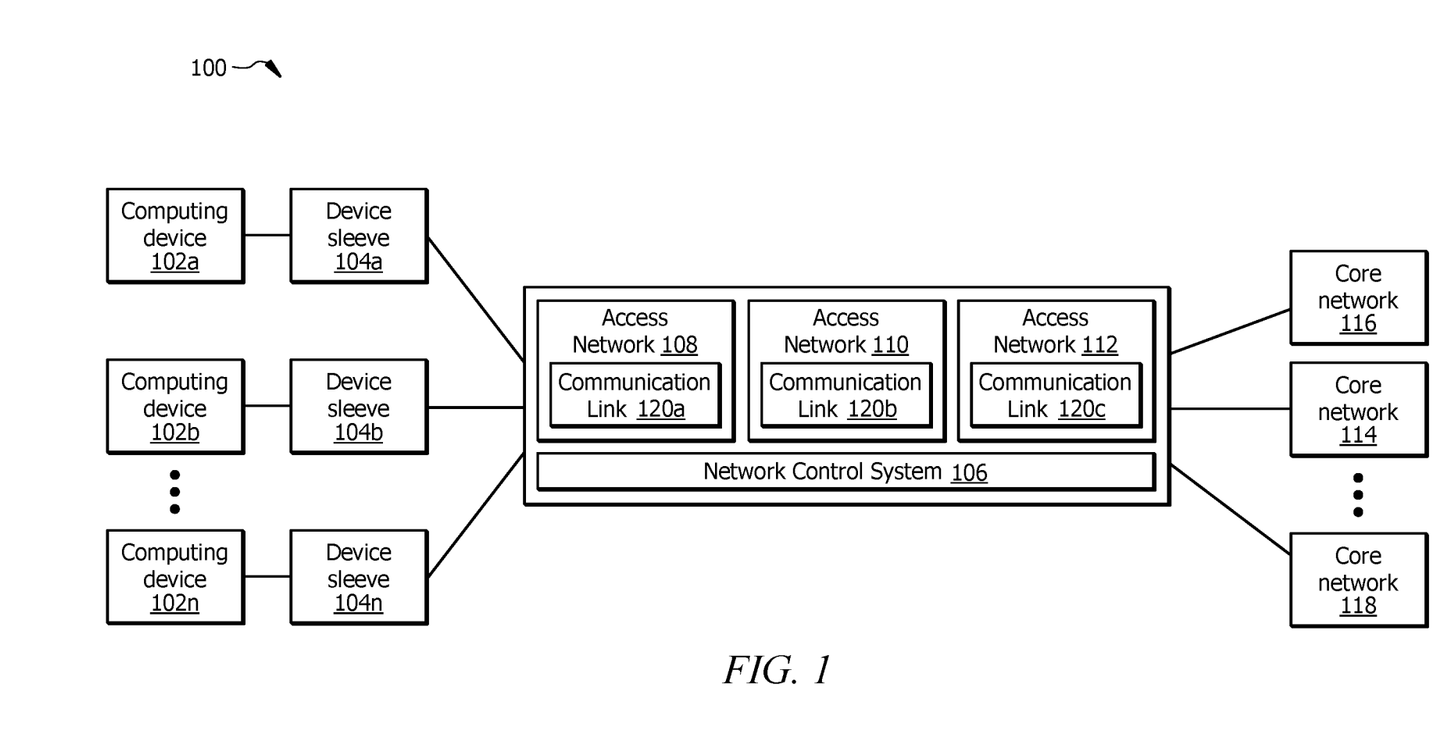
FIG. 1 illustrates an example of an overview of a distributed network environment, according to an embodiment.

FIG. 1 illustrates the distributed network environment 100 with which one embodiment can be implemented and comprises components/elements that are implemented at least partially by hardware at one or more network stations, and one or more computing devices, such as one or more controlling units, network processing units, one or more hardware processors executing stored program instructions stored in one or more memory units for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

In an embodiment, the distributed network environment 100 may be a multi-tenant environment. The distributed network environment 100 may include various computing devices 102a-120n (102), access networks 108, 110, and 112, and core networks 114, 116, and 118. The distributed network environment 100 may include 'n' number of computing devices, access networks, sub-networks of access networks, access nodes, WiFi networks, 3GPP standard networks, 3GPP custom networks, non-3GPP networks, tactical networks, core networks, network stations, sub-network stations, segments of network stations, zones, sub-zones of network stations, antenna, sub-part of antennas and other network interface and elements. The designation n in reference characters means that in embodiments, the actual number of devices, stations, interfaces, networks, sub-parts, zones, and elements corresponding to a reference character has no specific limit other than the processing capability of related elements.

In an embodiment, the client computing devices 102a-102n may comprise any kind of computing and/or electronic device such as a desktop computer, computer system, computing system, laptop computer, tablet computer, mobile computing device, smartphone, personal computers, personal digital assistants (PDAs), laptops, or workstations, notebook, netbook, tablet computer, e-book reader, global positioning system (GPS), camera, personal digital assistant (PDA), handheld electronic device, cellular telephone, smartphone, augmented/virtual reality (AR/VR) device, mixed reality (MR) device, other suitable electronic devices, or any suitable combination thereof. In some embodiments, the electronic device 102a-102n may comprise an AR device including, but not limited to, a head-mounted display device (HMD), an electromyographic wearable device (EMG), a head-up display device (HUD), AR glasses (smart glasses), smartphone AR (mobile AR), tethered AR headsets and any other devices with AR features. Throughout this disclosure, all references to "user" or "users" are specified for convenience but correspond to computing devices/electronic devices that execute the technical steps described in the disclosure. Thus, even where the terms "user" or "users" appear, all steps and functions of the disclosure are intended as computer-implemented steps or technical steps and not manual, mental, human-performed, or abstract steps, each of which is hereby expressly excluded from the scope of the claims and the disclosure. In an embodiment, the computing device 102a-102n may comprise one or more processors to implement computer-executable instructions that are stored in one or more memory or memory units of the computing device 102a-102n. In an embodiment, computing devices 102a-102n may be configured to run various kinds of application data. The application data may be related to one or more types of device applications, for example, mobile applications, browsing capabilities, video streams, audio streams, AR applications, MR applications, cellular and non-cellular functions, and other functions that any device may be capable of. Each computing device 102a-102n may be associated with registration information that may include, but is not limited to, one or more private identification (ID), device ID, geo-location data, and service level agreement (SLA). Each application data run in each computing device 102a-102n may define and/or be associated with geo-location information, for example, source address information and destination address information, types of data packets in stream of data packets associated with the application data, information exchange requirements (IER), and Quality of Service (QOS). In an embodiment, the application data may need communication or connection with any of the core network(s) 114, 116, and 118. In an embodiment, each computing device 102a-102n includes communication layers, for example, L1, L2, and internet protocol (IP) layer, and the computing device 102a-102n may be capable of implementing different wireless and wired connections.

In an embodiment, each client computing device 102a-102n may be associated with device sleeve 104a-104n. The device sleeve 104a-104n may be configured to store and use registration and connection information. In an embodiment, the device sleeve 104a-104n may be configured with processing units for establishing network communication with access networks 108, 110, and 112 and core networks 114, 116, and 118 via data communication links 120. For example, the device sleeve 104a-104n may include a tactical waveform co-processing unit.

In some embodiments, the network control system 106 may be an independent standalone router or WiFi node for various client computing devices 102a-102n, access networks, and core networks. In some embodiments, the network control system 106 may be any of including, but not limited to, the non-3GPP access point and service interface, the non-3GPP interworking function, the standard 3GPP gNodeB, the custom 3GPP gNodeB and service interface, the command-and-control broker and tactical data link gateway. In an embodiment, the network control system 106 may be configured to detect application data of a computing device, for example, an application, for example, chat application, video stream, or audio stream running in a smartphone. The application may need a particular kind of service and connection with the core network 114, 116, 118 that provides a wireless or wired connection. In a network environment, the network control system 106 may be configured to a network connection request from the stream of data packets the computing device 102a-102n may be requested to access. For example, from the stream of data packets of the application data and registration information of the computing device, it may be detected that the application data and the computing device 102a-102n may need a certain quality of service, bandwidth, and network speed. Based on the application data and the registration and connection information of the computing device 102a-102n, the network control system 106 determines which are the access networks 108, 110, 112, for example, non-tactical networks, tactical networks, custom networks, and WiFi, available to establish the network connection with core networks. The network control system 106 then utilizes the available access networks 108, 110, 112 and integrates the available access networks to create a network architecture and service interface for the translation of data flow using different and/or the same available access networks that enable wireless communication with the core network(s). In an embodiment, the data flow architecture and service interface may include, but is not limited to, a suite of service interfaces that may be created by using non3GPP (generation partnership project) access architecture, non-cellular architecture, alternate physical (ALT PHY) layer architecture, alternate networking and interconnection of communicating nodes, overlay and interconnection of heterogenous 3GPP networking architecture, heterogeneous topologies and interconnection of communication layers within 3GPP networking architecture, overlay, and interconnection of heterogeneous non3GPP networking architecture, non-5G-Capable over WLAN (N5CW) interconnection architecture, non-3GPP inter-working function (N3IWF) architecture, C3RAT architecture, policy enforcement architecture based on the application data and the registration information, overlay management architecture, command and control broker (C2B) and data link gateway DLG architecture and other interfaces. In an embodiment, a part or a portion of frequencies and bandwidth of access networks 108, 110, and 112 may be utilized for creating the data flow architecture and service interface. The network control system 106 may be configured to create the data flow architecture and service interface to result in any of the LPX capability, LPI capability, LPD capability, anti-jam capability, satellite access capability, and operation through outage capability. In one embodiment, the system may be configured to convert RF signals into a stream of data packets of one or more of: non-tactical waveforms, tactical waveforms, standard waveforms and custom waveforms via the data flow architecture and service interface for wireless communication with the core network(s). This manner of creating the network architecture with various layers of network interfaces may secure the computing device from detection, and the computing device may be undetectable by a jammer or malicious device. The components, units, and features of the network control system 106 are described in reference to FIG. 2 in later sections herein.

In an embodiment, the distributed network environment 100 includes a plurality of access networks 108, 110, and 112 and each of the access networks 108, 110 and 112 includes one or more network control systems 106. In an embodiment, all the access networks 108, 110 and 112 may be coupled to a single or central network control system 106 as shown in FIG. 1.

In some embodiments, the access networks 108, 110, and 112 may be different kinds of one or more of tactical systems, tactical networks, tactical radios, WiFi nodes, radio systems, blue force tracking of personnel and equipment, massive machine type communications (mMTC) networks, internet of things (IoT), NB-IOT, Ethernet, cellular networks, non-cellular networks, commercial and/or non-commercial networks, fiber optics networks, satellite networks, mobile networks, enhanced mobile broadband (cMBB), securing the connection to edge computing and real-time sensing nodes. In an embodiment, each of the plurality of access networks 108, 110, and 112 may be configured to generate tactical waveforms of stream of data packets of the computing device 102a-102n to connect with the core networks 114, 116, and 118. In an embodiment, each of the plurality of access networks 108, 110, and 112 may be configured to convert the RF signals into a stream of data packets of one or more of: non-tactical waveforms, tactical waveforms, standard waveforms and custom waveforms into streams of data packets via the data flow architecture and service interface for wireless communication with the plurality of core networks. Further, each of the plurality of access networks 108, 110, and 112 may be utilized to result in one or more capabilities including, but not limited to, LPX capability, LPI capability, LPD capability, anti-jam capability, satellite access capability, and operation through outage capability for connecting with the core networks 114, 116 and 118 for data flow translation to the core networks. In an embodiment, each of the plurality of access networks 108, 110 and 112 may include an interface session, an interface node, an access point, L1 layer, L2 layer, IP layer and Ethernet layers to communicate the stream of data packets based on the one or more capabilities. In an embodiment, one or more of the access networks 108, 110, 112 may be determined to be available for wireless communication with the core networks 114, 116, 118 based on the registration information and the type of application data of the computing device 102a-102n. In an embodiment, one or more of the access networks 108, 110, 112 may be utilized as a medium to connect with the core networks 114, 116, 118. In an embodiment, the plurality of access networks 108, 110, 112 may be integrated to create a data flow architecture and service interface and utilized to perform a translation of data flow according to the data flow architecture and service interface for wireless communication with the core networks 114, 116, 118. In an embodiment, the data flow architecture and service interface may include, but is not limited to, a suite of interfaces that may be created by using non3GPP (generation partnership project) access architecture, non-cellular architecture, alternate physical (ALT PHY) architecture, alternate networking and interconnection of communicating nodes, overlay and interconnection of heterogenous 3GPP networking architecture, heterogeneous topologies and interconnection of communication layers within 3GPP networking architecture, overlay, and interconnection of heterogeneous non3GPP networking architecture, non-5G-Capable over WLAN (N5CW) interconnection architecture, non-3GPP inter-working function (N3IWF) architecture, C3RAT architecture, policy enforcement architecture based on the application data and the registration information, overlay management architecture, C2B and DLG architecture and other interfaces. In an embodiment, a part or a portion of frequencies and bandwidth of access networks 108, 110, and 112 may be utilized for creating the data flow architecture and service interface. In some embodiments, different access networks 108, 110, 112, and/or different layers of access networks may be utilized for mapping, routing, re-routing, replicating, redirecting, and translating the stream of data packets of the client computing device 102a-102n according to the data flow architecture and service interface that may be based on registration information and the type of application data.

In an embodiment, the distributed network environment 100 includes a plurality of core networks 114, 116, and 118. The core network(s) 114, 116, 118 manage(s) access, mobility, sessions, policy, authentication, user data, control data, repository data, policy, and networks to serve base stations, mobile cellular stations, non-cellular stations, access networks, remote stations, access points, network antennas, tactical network stations, remote terminal stations, wireless stations, wired stations, wireless local loop (WLL) stations, hybrid base stations, servers, software as a service (SaaS), RF based network stations, tactical systems, tactical networks, tactical radios, WiFi nodes, radio systems, blue force tracking of personnel and equipment, NB-IOT, massive machine type communications (mMTC) networks, wireless modems, routers, network processing stations, baseband stations, carrier stations, channels stations, modulating stations, IOT, eMBB, securing connection to edge computing and real-time sensing nodes. The core network(s) 114, 116, 118 may include all functions, units, and components that can provide wireless communication and connection to each client computing device 102a-102n.

In an embodiment, the client computing devices 102a-102n, the plurality of access networks 108, 110, 112 and the plurality of core networks 114, 116, and 118 may be configured to communicate over one or more data communication links/networks 120a, 120b, 120c of respective access networks 108, 110, 112 to enable network packets exchange, connection, and communications between devices, access networks, stations, and components of the distributed network environment 100. Examples of the data communication links/network 120 include, without limitation, an ad hoc network, an intranet, an extranet, a virtual private network (VPN), a local area network (LAN), a wireless local area network (WLAN), a wide area network (WAN), a wireless wide area network (WWAN), a metropolitan area network (MAN), a portion of the Internet, a portion of the Public Switched Telephone Network (PSTN), near-field communication (NFC) network, a cellular technology-based network, a satellite communications technology-based network, Bluetooth, a cellular telephone network, or a combination of two or more of these networks. In an embodiment, the one or more data communication links 120 may include any suitable links. For example, the links may include but are not limited to, one or more wireline (for example, Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET), satellite links or Synchronous Digital Hierarchy (SDH)) links. Links need not necessarily be the same throughout the environment 100. One or more links may differ in one or more aspects from one or more other links. The computing devices 102a-102n, access networks 108, 110, 112, core networks 114, 116, 118 and other components of the distributed network environment 100 may host or include interfaces that are compatible with one or more networks and are programmed or configured to use standardized protocols for communication across the networks such as application programming interface (API) calls, transmission control protocol (TCP)/internet protocol (IP), Bluetooth, and higher-layer protocols such as hypertext transfer protocol (HTTP), transport layer security (TLS), and the like. One or more interfaces may be utilized to enable communication over the frequency channels/carriers, and the interfaces may include switches, access points, routers, a WiFi interface, a LAN interface, a WAN interface, or a modem. As a further example, the network interface may include a WiFi interface, a modem, a switch, or a router. In an embodiment, the network interface may be configured to use any suitable type of communication protocol as would be appreciated by one of ordinary skill in the art.

Figure 2:
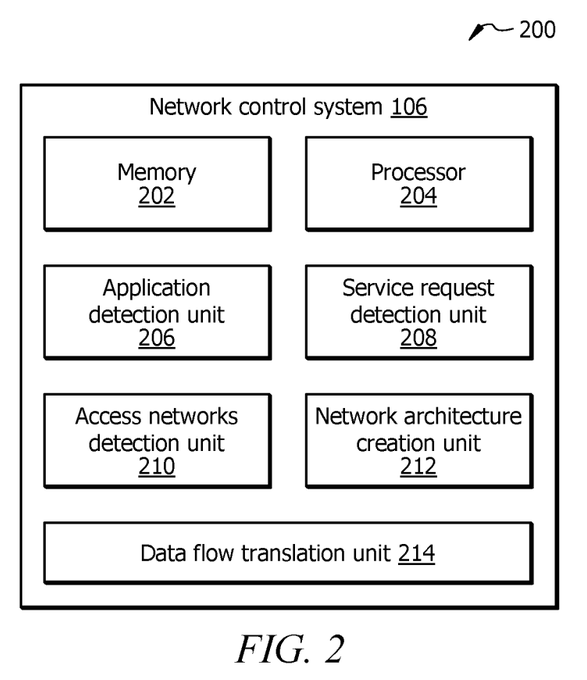
FIG. 2 illustrates components of a network control system according to an embodiment.

FIG. 2 illustrates components of the network control system 106 according to an embodiment. In an embodiment, the network control system 106 may comprise a set of executable program instructions or units of instructions such as executables, binaries, packages, functions, methods, interfaces, or objects. In an embodiment, the network control system 106 may be hard-wired to perform the techniques or may include functions of digital electronic devices such as at least one ASIC or field programmable gate array (FPGA) that is persistently programmed to perform the techniques or may include at least one general purpose hardware processor programmed to perform the techniques pursuant to program instructions in firmware, memory, other storage, or a combination. Such devices may also combine custom hard-wired logic, ASICs, or FPGAs with custom programming to accomplish the described techniques. The network control system 106 may include memory 202, processor(s) 204, interfaces, and system modules.

The memory 202 of the network control system 106 includes one or more disks, tape drives, or solid-state drives, and may be used as an over-flow data storage device to store programs when such programs are selected for execution and to store instructions and data that are read during program execution. Memory 202 may be volatile or non-volatile and may include ROM, random access memory (RAM), ternary content addressable memory (TCAM), dynamic random-access memory (DRAM), and static random-access memory (SRAM). In an embodiment, memory 202 may be configured to store registration information, and information on types of computing devices 102a-102n. In an embodiment, the registration information may include, but is not limited to, one or more private IDs, device IDs, geo-location data, and SLAs. Each application data run in each computing device 102a-102n may define and/or be associated with geo-location information, for example, source address information and destination address information, types of data packets in stream of data packets associated with the application data, IER, and QoS. In an embodiment, memory 202 may be configured to store information of users associated with the computing devices 102a-102n.

The processor(s) 204 of the network control system 106 may be any electronic circuitry including, but not limited to, state machines, one or more CPU chips, logic units, cores (e.g., a multi-core processor), FPGAs, ASICs, or digital signal processors (DSPs). The processor 204 may be a programmable logic device, a microcontroller, a microprocessor, or any suitable combination of the preceding. The processor is communicatively coupled to and in signal communication with the memory and the interface. The processor 204 may be configured to process data and may be implemented in hardware and/or software. For example, the processor 204 may be 8-bit, 16-bit, 32-bit, 64-bit, or any other suitable architecture. The processor 204 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

Network control system 106 may include various processing and controlling units that include, but are not limited to, application detection unit 206, service request detection unit 208, access networks detection unit 210, network architecture creation unit 212, and data flow translation unit 214.

The application detection unit 206 may be programmed or configured to detect application data specifying a network connection request from the stream of data packets of the computing device 102a-102n. The application data includes one or more types of device applications executed by the client computing device 102a-102n.

The service request detection unit 208 may be configured to detect the network connection request from the stream of data packets. Further, the service request detection unit 208 may be configured to detect a type of client computing device 102a-102n from the registration information and determine a type of wireless service from the application data and the network connection request of the computing device 102a-102n.

The access networks detection unit 210 may be configured to detect various access networks and determine which access networks are available or may be available for communicating with core networks. In an embodiment, the access networks detection unit 210 may be configured to determine a plurality of different access networks available for the type of wireless service of the client computing device 102a-102n.

The network architecture creation unit 212 may be configured to create a data flow architecture and service interface to establish a network connection with the plurality of core networks 114, 116, and 118 by integrating the plurality of different access networks 108, 110, and 112. In an embodiment, the data flow architecture and service interface may be created to result in any of LPX capability, LPI capability, LPD capability, anti-jam capability, satellite access capability, and operation through outage capability.

The data flow translation unit 214 may be configured to perform a translation of data flow according to the data flow architecture and service interface for wireless communication with the plurality of core networks 114, 116, and 118 using the plurality of different access networks 108, 110, 112. The data flow translation unit 214 may be configured to convert RF signals into a stream of data packets of one or more of: non-tactical waveforms, tactical waveforms, standard waveforms and custom waveforms via the data flow architecture and service interface for wireless communication with the plurality of core networks 114, 116, and 118. The data flow translation unit 214 may be configured to determine interface sessions, interface nodes, and access points to communicate the stream of data packets to translate data flow in the data flow architecture and service interface.

Figure 3:
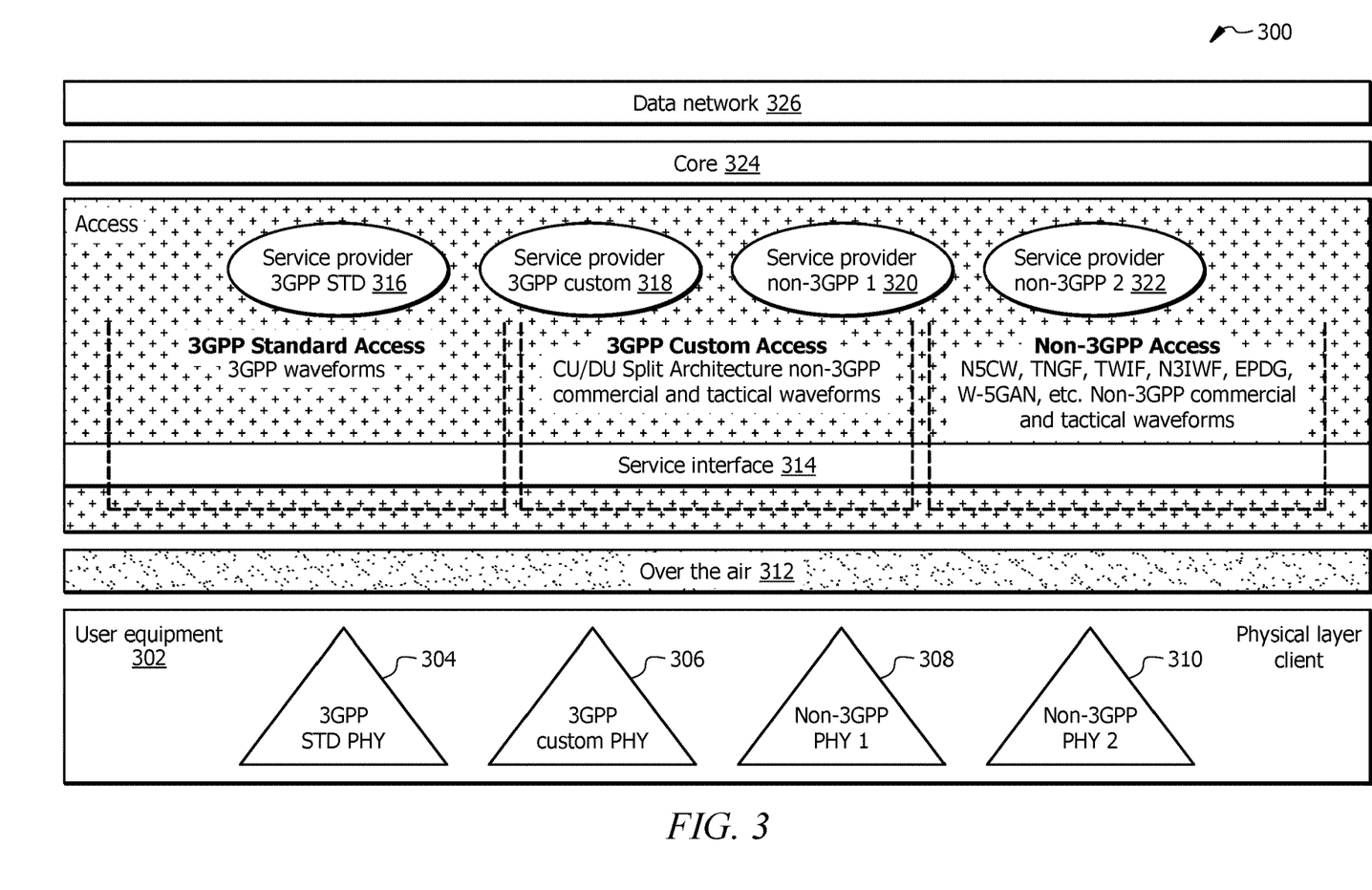
FIG. 3 illustrates an example of a system architecture of a Service-Interface-As-Type for 5G ALT PHY software system architectures, according to an embodiment.

FIG. 3 illustrates an example of a system architecture of a Service-Interface-As-Type, according to an embodiment. In an embodiment, Service-Interface-As-Type 300 shows a user equipment (UE) 302 having various layers of 3GPP STD (standard) PHY layer 304, 3GPP Custom PHY layer 306, non-3GPP PHY 1 layer 308 and non-3GPP PHY 2 layer 310. Further, Service-Interface-As-Type 300 shows access networks with communication layers. For example, service provider 3GPP STD 316 provides 3GPP standard access with 3GPP waveforms, service provider 3GPP custom 318 and service provider non-3GPP 1 layer 320 provide 3GPP custom access, and service provider non-3GPP 2 layer 322 having non-3GPP access capabilities. In an embodiment, service provider 3GPP custom 318, and service provider non-3GPP 1 layer 320 utilize split architecture of control unit (CU) and/or distributed unit (DU) of any of non-3GPP commercial and tactical waveforms.

In an embodiment, Service-Interface-As-Type 300 enables UE 302 PHY clients to access core network 324, and associated assets, for example, data network 326, MEC (Multi-access Edge Compute), etc., with maximal transaction uniformity using multiple radio access technologies (multi-RAT) including, but not limited to, 3GPP standard access 316, 3GPP custom access 318 and 320, and non-3GPP access 322. In an embodiment, 3GPP standard access 316 serves only standard 3GPP waveforms/UE clients through the gNodeB. In an embodiment, 3GPP custom access 318 and 320 use a modified CU-DU split RAN architecture to allow non-3GPP commercial and tactical waveforms/UE clients to access the core network 324. In an embodiment, non-3GPP access 322 uses non-5G-Capable (N5CW) over wireless local area network (WLAN), trusted non-3GPP gateway function (TNGF), trusted WLAN interworking function (TWIF), non-3GPP interworking function (N3IWF), evolved packet data gateway (ePDG), wireline 5G access network (W-5GAN) and similar gateways to allow non-3GPP commercial tactical and alternate waveforms/UE clients to access the core network 324.

In an embodiment, Service-Interface-As-Type 300 in 3GPP custom access 316 or non-3GPP access 322 enables an example use case in which a UE 302 client operates in a geographical region where over-the-air 312 waveform detection and obstruction may not be tolerated. Examples of clients operating in stressed environments include law enforcement, covert intelligence operations, military frontline, first responders, government official business, public figures, underserved communities, etc., Service-Interface-As-Type 300 also allows for seamless operation in benign environments using 3GPP standard access 316. In an embodiment, tasking of radio access type may be initiated either by the UE 302 or the network operators/planners and communicated through the Service-Interface-As-Type service. The Service-Interface-As-Type workflow and tasking may include, but are not limited to, access network discovery, trust management, registration management and connection management, and protocol data unit (PDU) session establishment, PDU modification and PDU release session. In an embodiment, messaging of stream of data packets of UE 302 may be enabled by the Service-As-Type interface in various ways including, but not limited to, command and control for communicating with the core network 324, data link gateway for communication with the core network 324 and routing the stream of data packets. In an embodiment, command and control messaging includes device layer parameters and physical layer parameters that may be tailored to each client, for example, center frequency assignment, bandwidth, data rate, waveform type, power control commanding, multiple access type, error control type, frame and slot size, retransmission requests, and propagation environment and channel quality. In an embodiment, data link gateway messaging parameters include session management, QoS, and application data, for example, voice, video, data). For routing, the stream of data packets may include service-leg type which may be point-to-point, and point-to-multipoint, network addressing, and gNodeB or access point or gateway handover topology.

In an embodiment, the Service-Interface-As-Type 300 may be a software system architecture that may be applied to a communications system architecture to manage the workflow, tasking, and messaging in the alternate PHY (ALT PHY) to gNodeB (base-station) or core network interface to enable network communication resiliency. In an embodiment, the software system architecture may also be applied to the UE PHY interface to UE chipsets. The software system architecture may implement a single client-server interface for all PHY clients, both COTS PHY and ALT PHY using the Service-Interface-As-Type. In an embodiment, the Service-Interface-As-Type may utilize specific service providers to execute tailored message parsing and work transactions for each unique PHY and covert the exchange into a centralized transaction for the upper layers (L2/L3), gateways, and core, to maximize the uniformity in the gNodeB and non-3GPP access.

Figure 4:
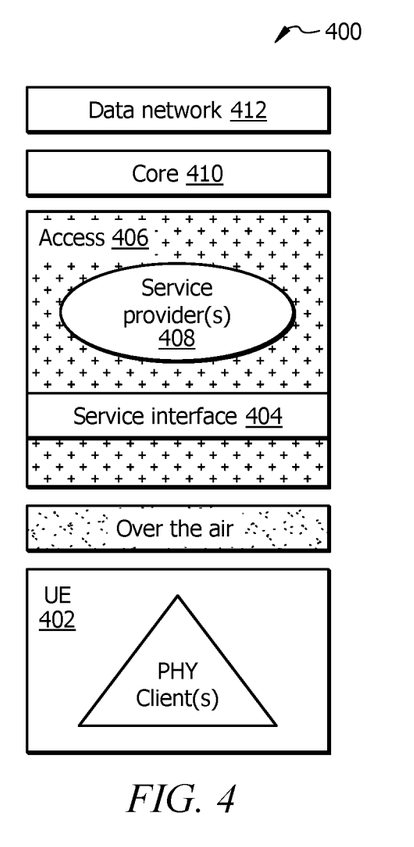
FIG. 4 illustrates an example of a Service-Interface-As-Type software systems architecture as pseudo-code classes in implementing a client-server interface in a network communications system architecture according to an embodiment.

FIG. 4 illustrates an example of a Service-Interface-As-Type software architecture as pseudo-code class 400 in implementing a client-server interface 404 according to an embodiment. In particular, FIG. 4 shows the Service-Interface-As-Type software architecture's pseudo-code classes, which remove programming language dependency in implementing a client-server interface 404 in a network communications system architecture.

FIG. 4 shows a UE 402 as one of PHY client(s), a service interface 404 accessed through layer 406 to a service provider(s) 408, for connecting to core network 410 and data network 412. In an embodiment, UE 402 may access service/interface by the following code:

```
public class LMPHYDemoClient {
PHYService mphyservice = PHYService.getInstance( );
myphyservice.CalculateBitErrorRate( );
}//Client only accesses the service/interface
```

In an embodiment, the service interface 404 may accessed by graphic language that uses JAVA syntax to illustrate Service-Interface-As-Type, which may be a programming language independently applied for network communication architecture. The service interface 404 may be accessed by the following code:

```
public interface PHYServiceInterface {
...
} // Define the Service Provider Interface
```

In an embodiment, the service provider(s) 408 may be accessed with the following code:

```
public class LMPHYServiceProvider implements
PHYService {
...
public class CalculateBitErrorRate( );
...
} // Implement the Service Provider
public class PHYService {
...
ServiceLoader.load (PhyServiceInterface.class)
} // Define the Service Instance
```

In an embodiment, the Service-Interface-As-Type may be utilized to enable a single interface to the gNodeB or access point of any network to service non-standard ALT PHY efficiently for network communication. In one example, this manner of utilizing the Service-Interface-As-Type improves mission resiliency objectives.

Figure 5:
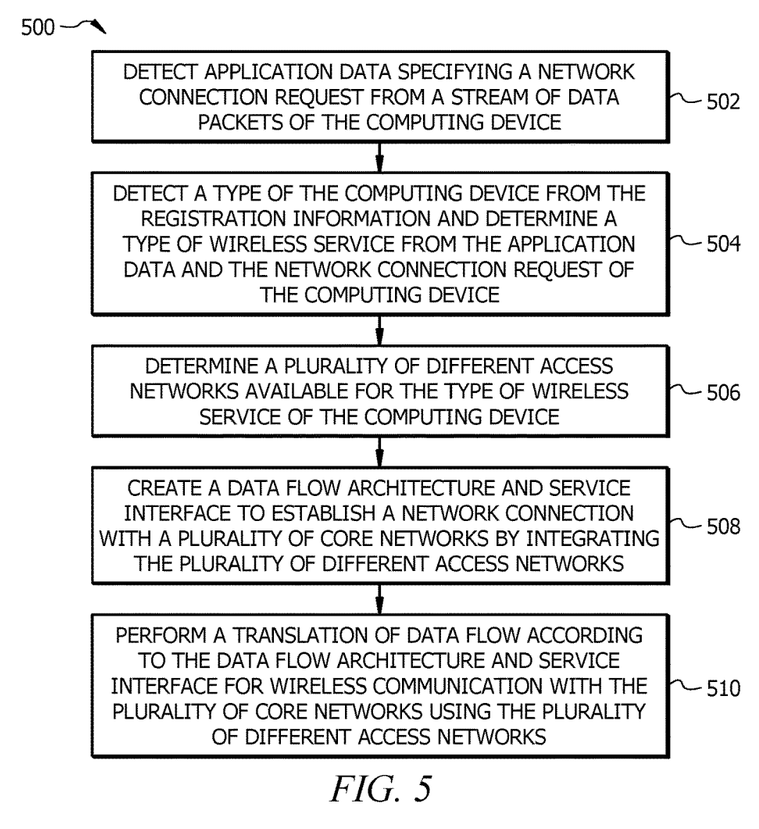
FIG. 5 is an example of a flowchart of a method for creating network architecture layers and service interface for network security and resiliency, according to an embodiment.

FIG. 5 is an example of a flowchart 500 of a process or method for creating network architecture layers for network security and resiliency, according to an embodiment. The process may be implemented by a network control system installed in a computing device. In an embodiment, the network control system may be a router. The process may be programmed to determine a plurality of access networks available for type of wireless service for running/implementing application data of the computing device and create a data flow architecture and service interface using the access networks for translation of data flow for wireless communication with a plurality of core networks.

The process begins at step 502 to detect application data specifying a network connection request from a stream of data packets of the computing device. In an embodiment, the application data includes one or more types of device applications executed by the computing device. For example, the application data may include but is not limited to, video stream, audio stream, browsing application, and/or chat application. Each application data may need a particular type of service and quality of service that may need connection with the core network(s).

At step 504, the process may be programmed to detect a type of computing device from registration information and determine a type of wireless service from the application data and the network connection request of the computing device. In an embodiment, the registration information of the computing device includes one or more private IDs, device ID, source address information and destination address information, types of data packets in the stream of data packets, information exchange requirements IER, SLA, and QoS.

At step 506, the process may be programmed to determine a plurality of different access networks available for the type of wireless service of the computing device. In an embodiment, plurality of different access networks comprises one or more of tactical systems, tactical networks, tactical radios, WiFi nodes, radio systems, blue force tracking of personnel and equipment, NB-IOT, mMTC networks, IOT, eMBB, securing connection to edge computing and real-time sensing nodes.

At step 508, the process may be programmed to create a data flow architecture and service interface to establish a network connection with a plurality of core networks by integrating the plurality of different access networks. In an embodiment, the data flow architecture and service interface may be created to result in any of the LPX capability, LPI capability, LPD capability, anti-jam capability, satellite access capability, and operation through outage capability. The data flow architecture and service interface comprises a suite of interfaces created by using non-3GPP access architecture, non-cellular architecture, ALT PHY architecture, alternate networking and interconnection of communicating nodes, overlay and interconnection of heterogeneous 3GPP networking architecture, heterogeneous topologies and interconnection of communication layers within 3GPP networking architecture, overlay, and interconnection of heterogenous non-3GPP networking architecture, N5CW interconnection architecture, N3IWF architecture, C3RAT architecture, policy enforcement architecture based on the application data and the registration information, overlay management architecture, C2B and DLG architecture and other interfaces.

At step 510, the process may be programmed to perform a translation of data flow according to the data flow architecture and service interface for wireless communication with the plurality of core networks using the plurality of different access networks. In an embodiment, the process may be programmed to determine an interface session, an interface node, and an access point of access networks to communicate the stream of data packets to translate data flow in the data flow architecture and service interface. The process may determine the interface session, interface node, and/or access point for mapping, routing, re-routing, replicating, redirecting, and translating the stream of data packets of the computing device according to the data flow architecture and service interface that may be based on registration information and the type of application data. The process may convert the RF signal into a stream of data packets of one or more of the non-tactical waveforms, tactical waveforms, standard waveforms and custom waveforms via the data flow architecture and service interface for wireless communication with the plurality of core networks.

In an embodiment, this disclosure provides a solution to the existing systems and provides various benefits. For example, the embodiments provide software architecture to ensure ALT PHY interoperation with 5G or non-5G upper layers in the network (and 5G or non-5G UE chipsets). In an embodiment, the utilization of the Service-Interface-As-Type for network communication may be programming language independent. The embodiments further provide advantages in modularization, reusability, maintainability and testing, scalability, and extensibility. Also, the utilization of the Service-Interface-As-Type for network connectivity may reduce physical interface integration risks to ALT PHY. Embodiments may utilize ad-hoc software architecture using non-object-oriented data structures and context-specific interface, multiple interfaces at vendor/client programmer system level and separate (repeated) software threads for each ALT PHY access to the core network. Further, the disclosure may be used in any market requiring secure resilience, for example, LPX communication in stressed or contested environments, military and specialized environments. For example, the disclosure may be used in tactical radio, blue force tracking of personnel and equipment using NB-IOT, mMTC used for industrial, power/nuclear plant sensors, industrial/battlefield IOTs and eMBB, and securing connection to edge computing and real-time sensing nodes.

Figure 6:
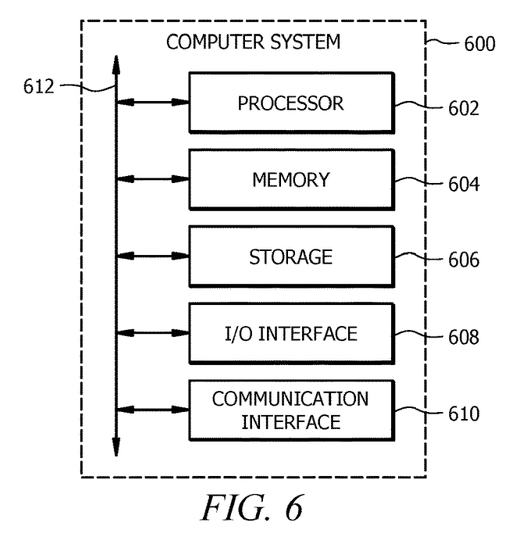
FIG. 6 illustrates an example computer system according to certain embodiments.

FIG. 6 illustrates an example computer system 600. In particular embodiments, one or more computer systems 600 perform one or more steps of one or more methods described or illustrated herein. In particular embodiments, one or more computer systems 600 provide the functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
    a memory configured to store registration information of a client computing device; and
    a hardware processor communicatively coupled to the memory, the hardware processor configured to:
        detect application data specifying a network connection request from a stream of data packets of the client computing device;
        detect a type of the client computing device from the registration information and determine a type of wireless service from the application data and the network connection request of the client computing device;
        determine a plurality of different access networks available for the type of wireless service of the client computing device;
        create a data flow architecture and service interface to establish a network connection with a plurality of core networks by integrating the plurality of different access networks; and
        perform a translation of data flow according to the data flow architecture and service interface for wireless communication with the plurality of core networks using the plurality of different access networks.

2. The system of claim 1, wherein registration information of the client computing device comprises one or more of private identification (ID), device ID, source address information and destination address information, types of data packets in the stream of data packets, information exchange requirements (IER), service level agreement (SLA), and Quality of Service (QOS).

3. The system of claim 1, wherein the application data comprises one or more types of device applications executed by the client computing device.

4. The system of claim 1, wherein the plurality of different access networks comprises one or more of tactical systems, tactical networks, tactical gateways, tactical radios, WiFi nodes, 3GPP nodes, non-3GPP nodes, non-3GPP gateways, radio systems, blue force tracking of personnel and equipment, narrow-band internet of things (NB-IOT), massive machine type communications (mMTC) networks, internet of things (IOT), enhanced mobile broadband (eMBB), securing connection to edge computing and real-time sensing nodes.

5. The system of claim 1, wherein the system is configured to convert radio frequency (RF) signals into a stream of data packets of one or more of: non-tactical waveforms, tactical waveforms, standard waveforms and custom waveforms via the data flow architecture and service interface for wireless communication with the plurality of core networks.

6. The system of claim 1, wherein the system is configured to create the data flow architecture and service interface to result in any of low probability of X (LPX) capability, low probability of intercept (LPI) capability, low probability of detection (LPD) capability, anti-jam capability, satellite access capability and operation through outage capability.

7. The system of claim 6, wherein the system is configured to determine an interface session, an interface node, and an access point to communicate the stream of data packets and to translate data flow in the data flow architecture and service interface.

8. A method, comprising:
  detecting, by a system, application data specifying a network connection request from a stream of data packets of a client computing device, wherein:
    the system comprises a memory configured to store registration information of the client computing device; and a hardware processor communicatively coupled to the memory;
  detecting a type of the client computing device from the registration information and determines type of wireless service from the application data and the network connection request of the client computing device;
  determining a plurality of different access networks available for the type of wireless service of the client computing device;
  creating a data flow architecture and service interface to establish a network connection with a plurality of core networks by integrating the plurality of different access networks; and
  performing a translation of data flow according to the data flow architecture and service interface for wireless communication with the plurality of core networks using the plurality of different access networks.

9. The method of claim 8, wherein registration information of the client computing device comprises one or more of private identification (ID), device ID, source address information and destination address information, types of data packets in the stream of data packets, information exchange requirements (IER), service level agreement (SLA), and Quality of Service (QOS).

10. The method of claim 8, wherein the application data comprises one or more types of device applications executed by the client computing device.

11. The method of claim 8, wherein the plurality of different access networks comprises one or more of tactical systems, tactical networks, tactical radios, WiFi nodes, radio systems, blue force tracking of personnel and equipment, narrowband internet of things (NB-IOT), massive machine type communications (mMTC) networks, internet of things (IOT), enhanced mobile broadband (eMBB), securing connection to edge computing and real-time sensing nodes.

12. The method of claim 8, further comprising converting radio frequency (RF) signals into a stream of data packets of one or more of: non-tactical waveforms, tactical waveforms, standard waveforms and custom waveforms via the data flow architecture and service interface for wireless communication with the plurality of core networks.

13. The method of claim 8, further comprising creating the data flow architecture and service interface to result in any of low probability of X (LPX) capability, low probability of intercept (LPI) capability, low probability of detection (LPD) capability, anti-jam capability, satellite access capability and operation through outage capability.

14. The method of claim 8, further comprising determining an interface session, an interface node, and an access point to communicate the stream of data packets and to translate data flow in the data flow architecture and service interface.

15. A non-transitory computer-readable medium storing instructions that, when executed by a processor, causes the processor to:
  detect application data specifying a network connection request from a stream of data packets of a client computing device;
  detect a type of the client computing device from registration information and determine a type of wireless service from the application data and the network connection request of the client computing device;
  determine a plurality of different access networks available for the type of wireless service of the computing device;
  create a data flow architecture and service interface to establish a network connection with a plurality of core networks by integrating the plurality of different access networks; and
  perform a translation of data flow according to the data flow architecture and service interface for wireless communication with the plurality of core networks using the plurality of different access networks.

16. The non-transitory computer-readable medium of claim 15, wherein registration information of the client computing device comprises one or more of private identification (ID), device ID, source address information and destination address information, types of data packets in the stream of data packets, information exchange requirements (IER), service level agreement (SLA), and Quality of Service (QOS).

17. The non-transitory computer-readable medium of claim 15, wherein the plurality of different access networks comprises one or more of tactical systems, tactical networks, tactical radios, WiFi nodes, radio systems, blue force tracking of personnel and equipment, narrow-band internet of things (NB-IOT), massive machine type communications (mMTC) networks, internet of things (IOT), enhanced mobile broadband (eMBB), securing connection to edge computing and real-time sensing nodes.

18. The non-transitory computer-readable medium of claim 15, wherein the instructions when executed by the processor, further cause the processor to: convert radio frequency (RF) signals into a stream of data packets of one or more of: non-tactical waveforms, tactical waveforms, standard waveforms and custom waveforms via the data flow architecture and service interface for wireless communication with the plurality of core networks.

19. The non-transitory computer-readable medium of claim 15, wherein the instructions when executed by the processor, further cause the processor to: create the data flow architecture and service interface to result in any of low-probability of X (LPX) capability, low probability of intercept (LPI) capability, low probability of detection (LPD) capability, anti-jam capability, satellite access capability and operation through outage capability.

20. The non-transitory computer-readable medium of claim 15, wherein the instructions when executed by the processor, further cause the processor to: determine an interface session, an interface node, and an access point to communicate the stream of data packets and to translate data flow in the data flow architecture and service interface.

* * * * *